Jan. 30, 1934.  W. LÖBBE  1,945,324
CONVEYER
Filed Feb. 10, 1932  5 Sheets-Sheet 1
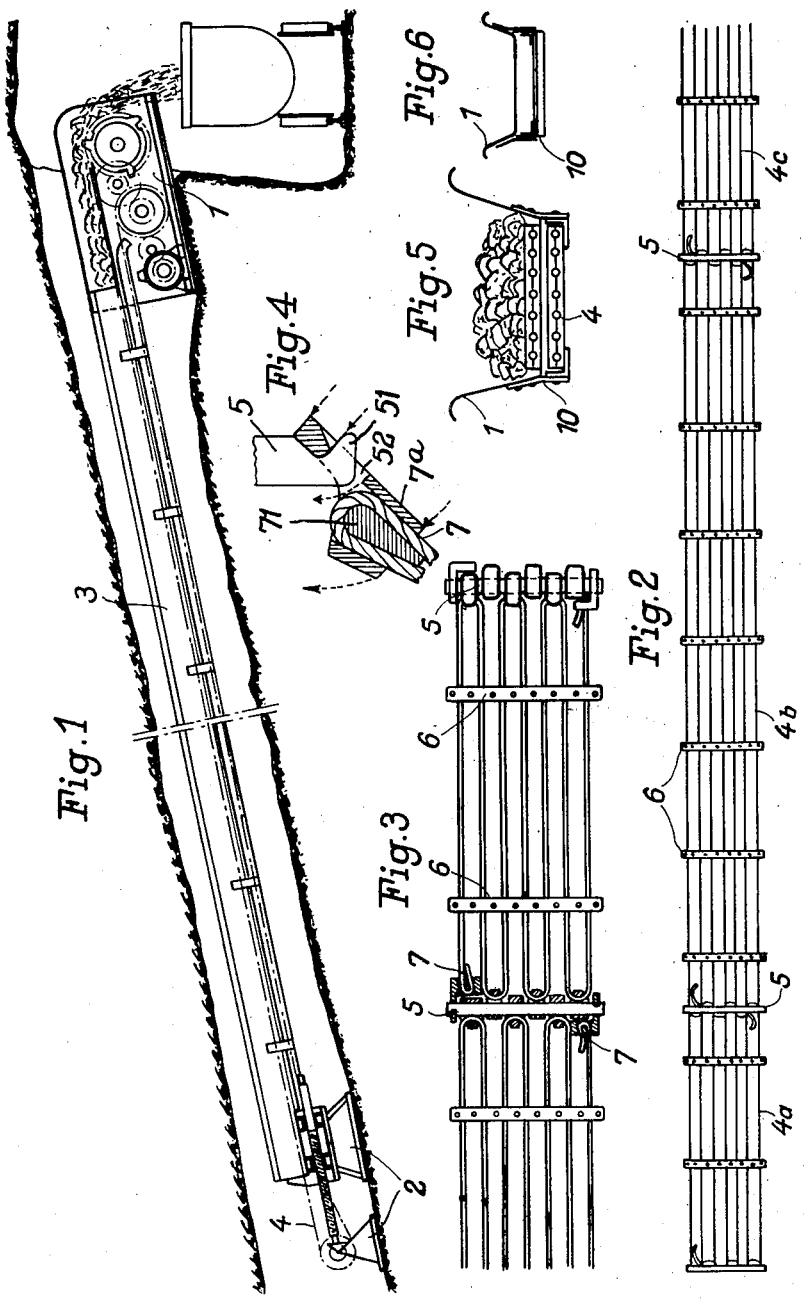
Inventor:
W. Löbbe
By: Marks & Clerk Inventor:
W. Löbbe
By: Marks & Clerk
Attys.

Jan. 30, 1934.    W. LÖBBE    1,945,324
CONVEYER
Filed Feb. 10, 1932    5 Sheets-Sheet 3

Inventor:
W. Löbbe
By: Marks & Clerk
Attys.

Jan. 30, 1934.   W. LÖBBE   1,945,324
CONVEYER
Filed Feb. 10, 1932   5 Sheets-Sheet 4
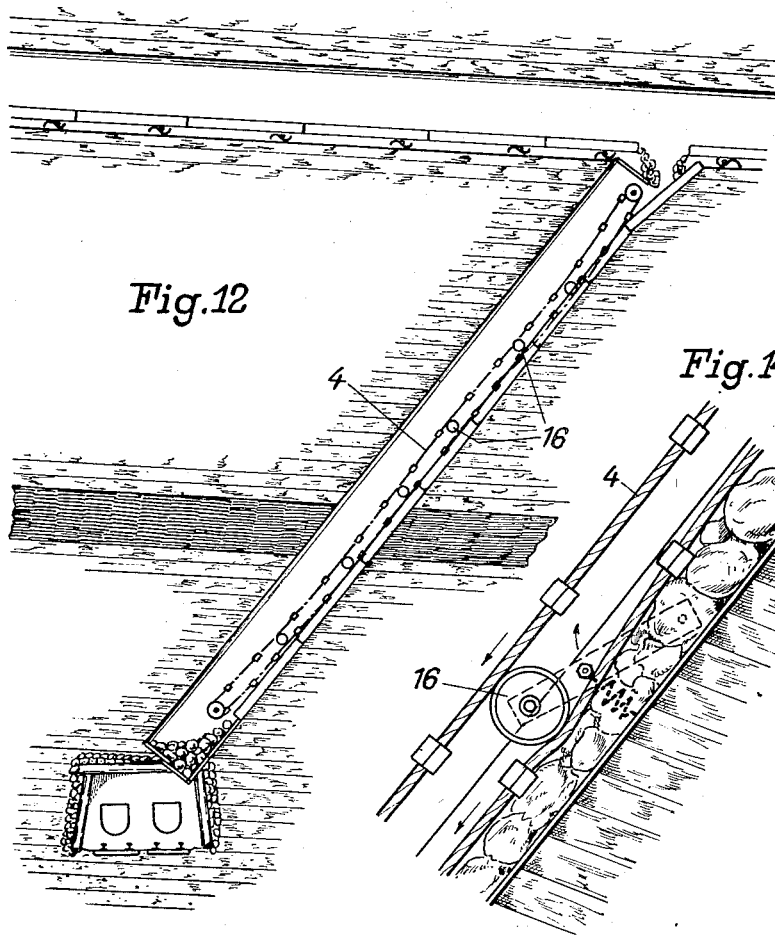

Jan. 30, 1934.  W. LÖBBE  1,945,324
CONVEYER
Filed Feb. 10, 1932  5 Sheets-Sheet 5

Inventor:
W. Löbbe
By: Marks & Clerk
Attys.

Patented Jan. 30, 1934

1,945,324

UNITED STATES PATENT OFFICE 1,945,324

CONVEYER

Wilhelm Löbbe, Westphalia, Germany

Application February 10, 1932, Serial No. 592,088, and in Germany February 18, 1931

4 Claims. (Cl. 198—190)

This invention relates to conveyers for material in bulk and more particularly for such conveyers for use in mines.

Conveyers for mines have been proposed comprising a plurality of endless conveyer chains housed in a chain housing comprising two superposed shallow troughs provided with solid bottoms, said chains being arranged to support and convey the material through the upper trough and to return through the bottom trough of the housing. Such a construction is very expensive, particularly when the conveyor chains are of small pitch as previously proposed.

The object of the present invention is to provide a conveyer for the purposes referred to which can be readily adapted to any requirements, is simple in construction and is also cheap to manufacture. With this object in view the invention comprises the combination with a chute of a rope conveyer band composed of a plurality of sections each comprising a plurality of lengths of rope which are held apart in spaced relationship by means of transverse spacing members connected to the lengths of rope at definite distances apart, said conveyer band being arranged in the chute so as to be capable of travelling therein for conveying material in bulk placed in the chute.

On to the conveyer which is simple in operation and easy to attend to the coal or other material to be conveyed is charged, as in the case of an ordinary chute. During the conveyance all material below a definite size of grain falls through between the lengths of rope on to the bottom of the chute, while the coarser material remains on the top of the rope band. The rope band as it were floats in the material, carrying both the material lying on it and that lying below it along with it. Through the exceedingly light weight of the band, which floats in the coal or the material in bulk and the small specific load on the band the expenditure of power required and the wear is exceedingly slight. It is also possible to cope with great conveying distances. Owing to the flexibility of the rope band the new conveying device has great advantages especially in confined spaces and when subjected to rough treatment. There are no rollers and joints requiring attention, as is the case with jigging conveyers, belt conveyers, plate bands and scraper bands. For upward inclinations the possible uses of the new conveyer are greater, say by 30%, than with belt conveyer bands, although the initial cost is considerably lower.

In cases where the ground on which it travels is undulating and in cases of disturbances and warping, the new conveyer device operates while resting on the ground and while following all inequalities just as reliably as when in the stretched state. There is no fear of overflowing occurring, as is the case with jigging conveyers. The low weight of the rope band, which amounts to about 6 kg. per metre, with a breaking load of about 20,000 kg. makes it possible to use very great continuous conveying lengths.

In the accompanying drawings several constructional examples of the new conveying device are illustrated.

Figs. 1–11 represent a rope band conveyer for horizontal or slightly inclined conveying, Fig. 1 showing the conveyer as a whole diagrammatically in side elevation, Fig. 2 a plan view of the stretched coupled rope band.

Fig. 3 shows a portion of the rope band with the end coupling members for connecting the sections of the rope band, Fig. 4 the locking eyes of the end coupling members.

Figs. 5 and 6 the chutes in cross-section.

Figure 7:
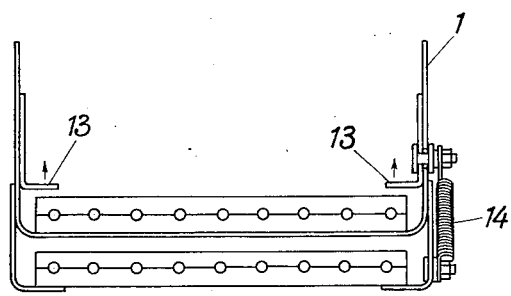

Fig. 7 is a cross-section through the chute at a point where yielding guiding pieces are provided.

Figure 8:
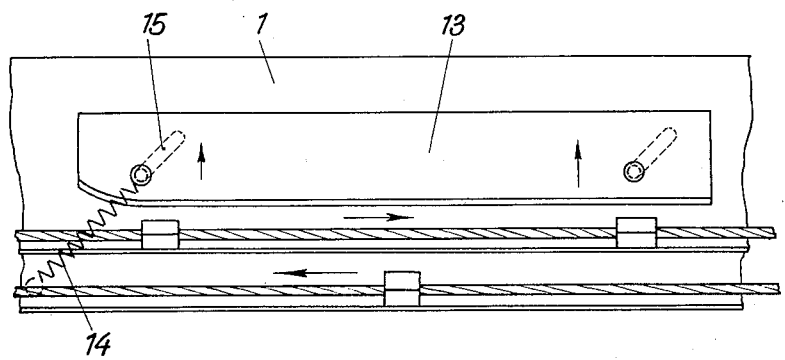

Fig. 8 shows the same part of the chute in side elevation.

Figure 9:
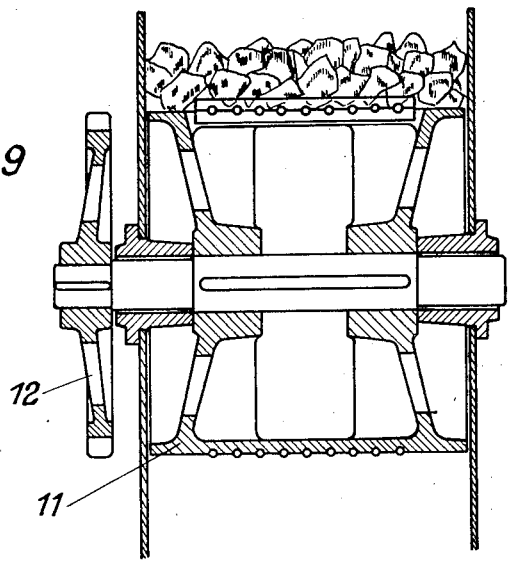

Fig. 9 shows a peg drum in longitudinal section.

Figure 10:
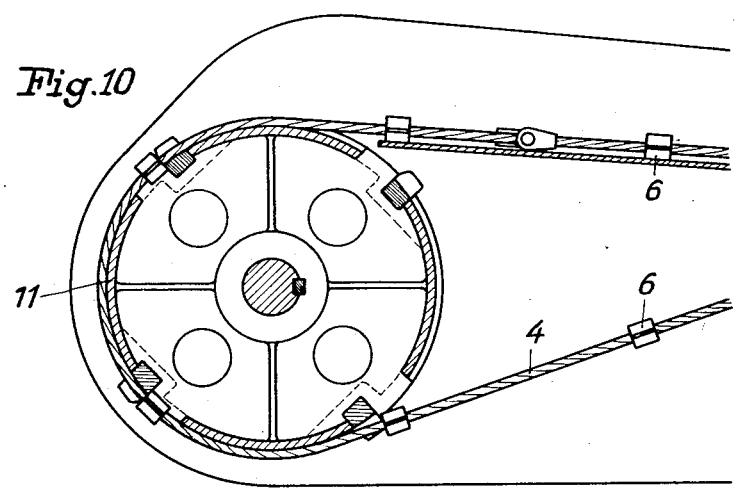

Fig. 10 shows the same peg drum in cross-section.

Figure 11:
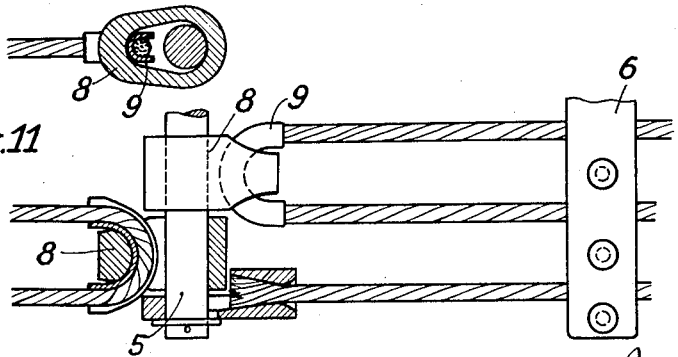

Fig. 11 shows the connection of two rope band elements to an enlarged scale.

Figs. 12–14 represent a constructional form for conveying material downwards at a steep inclination, Fig. 12 showing diagrammatically the whole of the device, Fig. 13 being a cross-section through the conveying device and Fig. 14 a portion of the device in longitudinal section.

Figure 15:
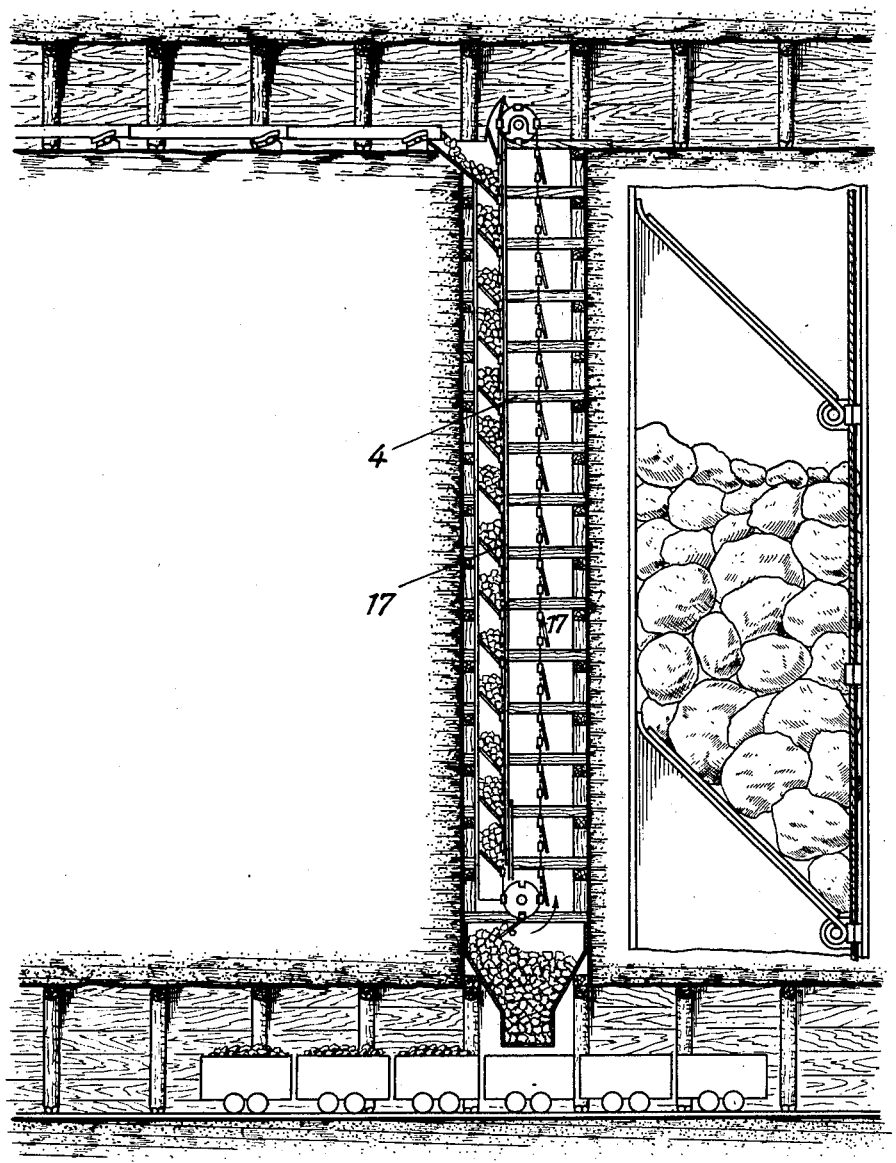

Fig. 15 shows diagrammatically a constructional form for vertical downward conveyance.

In the constructional forms according to Figs. 1–11 of the drawings 1 is the driving gear, 2 the reversing station and 3 the chute between these points. 4 is the rope band. The rope band consists of separate rope band sections 4a, 4b, 4c, which are connected together by end coupling members 5. Each rope band element is formed by a rope which is coiled sinuously to form a plurality of lengths. The individual lengths of each rope band element are spaced apart by transverse bars 6. At the end of the individual lengths of each rope band element are loops 7 through which for connecting the adjacent band elements a flat or round iron bar is inserted, which acts as a coupling member. At the places of reversal the rope is held by hooks or eyes 8 provided on the coupling member (see Fig. 11), at which points the rope may be protected by sleeves 9 which are drawn over it and pressed on it.

In Fig. 4 a terminal or locking loop is shown, the figure illustrating the moment of locking which is brought about by turning the loop in the direction of the arrows. The end of the rope is passed through a taper socket 7a, after which it is looped round a spacing wedge 71 and the looped end together with the wedge 71 is passed into the socket in which the loop end of the rope is gripped between the taper walls of the socket and the wedge 71. The socket has an opening 52 into which the hook-shaped end 51 of the end coupling member 5 engages.

The lower part 10 of the chute 1 (Fig. 5) serves for the return travel of the rope band 4.

In Fig. 6 the bottom part 10 of the chute is an independent piece into which the chute 1 is laid.

The rope band 4 is suitably driven by the peg drum 11 shown in Figs. 9 and 10, which is rotated by the driving wheel 12 through suitable transmission gear.

When much fine material is present which falls through between the separate rope lengths in large quantities, the rope band shows a tendency to climb. For preventing this, guiding pieces 13 are provided as shown in Figs. 7 and 8 laterally on the chute, which are held yieldingly by springs 14 in slots 15 in the chute 1, so that they can yield in the direction towards the rope band. By these guiding pieces the rope band is pressed down into the chute. The provision of such guiding pieces is also to be recommended in cases where there are changes of direction in the run of the conveyer band.

In the constructional form shown in Figs. 12-14 the rope band 4 is constructed in the same way as in the previous examples. The material to be conveyed downwards at a steep inclination in this case lies between the rope band 4 and the chute 1. The rocking pressure-applying rollers 16 press the rope band down on to the material as will be seen more particularly in Fig. 14 and prevent the material from sliding down too rapidly. When the rope band 4 is driven at a certain speed the material lying between the rope band and the chute will travel with it. The band does not rest rigidly against the material but yieldingly. If with a too steep inclination of the conveying arrangement the pressure of the rope band should not be sufficient for preventing the material from falling down, the rope band may be provided with raised members or the load on the band may be increased by weights on levers or by springs. The rope band 4 is returned over the pressure-applying rollers 16.

When the conveyer is used only for conveying material downwards special driving means for the rope band will not be required or only for regulating the speed of the band, which, however, can be effected by a centrifugal governor or the like. Preferably the regulation will be made such that the charging of the conveyer is independent of the output, the output being made directly proportional to the speed of the band.

When the material is to be conveyed vertically the rope band 4 is provided, as shown in Fig. 15, at intervals with flaps 17 which rest against the wall of the chute and divide up the material to be conveyed. In this way the material is effectively prevented from falling. When the conveying device is used only for conveying material downwards, special driving means for the rope band are not required in this constructional form as well. The length of the flaps 17 is made such that they rest in an inclined position against the wall of the chute.

What I claim is:

1. A conveyer for material in bulk, comprising the combination with a chute of a rope conveyer band composed of a plurality of sections, each comprising a plurality of lengths of rope and transverse spacing members connected to said lengths of rope at definite distances apart so as to hold the lengths of rope in spaced relationship to one another said rope conveyer band being arranged in the chute so as to be capable of travelling therein.

2. A conveyer for material in bulk, comprising the combination with a chute of a rope conveyer band composed of a plurality of sections, each comprising a plurality of lengths of rope and transverse spacing members connected to said lengths of rope at definite distances apart so as to hold the lengths of rope in spaced relationship to one another, said lengths of rope having loops at the end thereof for receiving transverse connecting bars for connecting the sections of the rope conveyer band together.

3. A conveyer for material in bulk, comprising the combination with a chute of a rope conveyer band composed of a plurality of sections, each comprising transverse end coupling members, a rope coiled sinuously with the places of reversal connected to said end coupling members so as to form a plurality of lengths of rope and transverse spacing members connected to said lengths of rope at definite distances apart so as to hold the lengths of rope in spaced relationship to one another, said rope conveyer band being arranged in the chute so as to be capable of travelling therein.

4. A conveyer for material in bulk, comprising the combination with a chute of a rope conveyer band composed of a plurality of sections, each comprising a plurality of lengths of rope and transverse spacing members connected to said lengths of rope at definite distances apart so as to hold the lengths of rope in spaced relationship to one another, said rope conveyer band being arranged in the chute so as to be capable of travelling therein and guiding members mounted at the sides of the chute so as to be capable of yielding, for preventing the rope band from mounting.

WILHELM LÖBBE.